Patented May 18, 1926.

1,585,145

UNITED STATES PATENT OFFICE.

CLARENCE P. HARRIS, OF NEW YORK, N. Y., AND NATHANIEL M. ELIAS, OF NEW BRUNSWICK, NEW JERSEY.

DIAZOTIZATION OF ORGANIC COMPOUNDS.

No Drawing.  Application filed June 17, 1924. Serial No. 720,517.

This invention relates to the diazotization of organic compounds, in other words to reactions in which an organic compound is subjected to the action of nitrous acid.

Diazotization has heretofore generally been carried out in dilute solution, by subjecting an alkali metal nitrite to the action of hydrochloric acid, this reaction being carried on in the presence of the substance to be diazotized.

According to the present invention, it is rendered possible to carry out the diazotization in very concentrated or almost anhydrous solution, and by the use of sulphuric instead of hydrochloric acid. Under these conditions the mechanism of the reaction which takes place is probably entirely different from that which occurs in the usual diazotization process.

The process of the present invention will be most readily understood from the following specific example, having reference to the diazotization of aniline, it being understood, however, that the invention is not limited to this use, but is capable of general application.

The aniline which is to be treated is mixed with sulphuric acid of approximately 93% concentration, the quantity of sulphuric acid being less than the amount which is theoretically required to convert all of the aniline into aniline sulphate, the excess of the aniline being employed to form a reaction mass of such consistency that it may be agitated. Other substances may be substituted for the excess aniline as diluent. To this mixture is added a catalytic amount of hydrochloric acid or any other acid whose amine salt is soluble in the diluent employed, which in the example is aniline oil, the amount of catalyst employed being varied in accordance with the type of equipment used, the cooling surface available, and other factors of a similar nature, the general rule being that the greater the amount of catalyst employed, the more vigorous the reaction obtained, but only a small fraction of the amount needed to complete the reaction being necessary and this remaining unchanged after reaction is complete. In actual practice the reaction has frequently been carried out with catalyst present in an amount of approximately 2% of the total aniline employed. If preferred, the sodium nitrite and hydrochloric acid may be mixed before added to the reaction mass, and the catalyst so formed may be added to the reaction mass.

Solid sodium nitrite of the desired amount for the diazotization is now gradually added, the temperature being kept in the neighborhood of approximately forty-five degrees. The sodium sulphate formed by the reaction of the sodium nitrite and the sulphuric acid precipitates out of solution to a large extent, thus keeping the reaction mass almost anhydrous because of its great affinity for water. When all of the sodium nitrite has been added, the aniline equivalent to the nitrite employed will have been converted to diazobenzene and the reaction mass may be treated in any way that may be desired to separate out the diazobenzene or to form further products from it, in accordance with the usual practice.

The reaction which takes place during the above described process has not been definitely determined, but probably involves the intermediate formation of nitrosulphonic acid by the reaction of a mixture of nitrogen oxides whose empiric formula is $N_2O_3$ with sulphuric acid. The nitrosulphonic acid reacts with water to form nitrous acid and sulphuric acid, the nitrous acid being the diazotizing agent. It thus appears that nitrosulphonic acid can be used in place of sodium nitrite and sulphuric acid.

The above opinion regarding the mechanism of the reaction is based on two facts, one, that concentrated sulphuric acid reacts with a mixture of nitrogen oxides to form nitrosulphonic acid whose formula is $SO_3{<}^{OH}_{ON}$ and two, that the action can be carried out with nitrosulphonic acid instead of sodium nitrite and sulphuric acid.

What we claim is:

1. The method of diazotizing an organic amino compound which consists in treating the compound with sulphuric acid and alkali metal nitrite.

2. The method of diazotizing an organic amino compound which consists in treating the compound with an acid which forms a salt of the amine soluble in the diluent employed, in the presence of strong sulphuric acid and an alkali metal nitrite.

3. The method of diazotizing an organic amino compound which consists in using nitrosulphonic acid in the presence of the said compound, and subjecting the compound to the action of said acid, in the presence of a catalytic amount of an acid which forms an amine salt soluble in the diluent employed.

4. The method of diazotizing an organic amino compound which consists in subjecting the compound to treatment with nitrosulphonic acid.

5. The method of diazotizing aniline which consists in treating aniline with concentrated sulphuric acid, adding to this mass a catalytic amount of an acid which forms an aniline salt soluble in the diluent employed and then adding solid alkali metal nitrite.

6. The method of diazotizing an organic amino compound, which consists in treating concentrated sulphuric acid with an alkali metal nitrite in the presence of this compound, this reaction being performed with the aid of a catalytic amount of an acid which forms an amine salt soluble in the diluent employed.

7. The method of diazotizing an organic amino compound, which consists in treating with concentrated sulphuric acid an alkali metal nitrite in the presence of said compound, and adding to the reaction mass a catalytic amount of acid whose amine salt is soluble in the diluent employed.

In testimony whereof we have affixed our signatures to this specification.

CLARENCE P. HARRIS.
NATHANIEL M. ELIAS.